United States Patent
Johnson et al.

(10) Patent No.: US 6,938,133 B2
(45) Date of Patent: Aug. 30, 2005

(54) MEMORY LATENCY AND BANDWIDTH OPTIMIZATIONS

(75) Inventors: Jerome J. Johnson, Spring, TX (US); Benjamin H. Clark, Spring, TX (US); Gary J. Piccirillo, Cypress, TX (US); John M. MacLaren, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 204 days.

(21) Appl. No.: 09/965,913

(22) Filed: Sep. 28, 2001

(65) Prior Publication Data

US 2003/0070055 A1 Apr. 10, 2003

(51) Int. Cl.[7] .............................................. G06F 12/00
(52) U.S. Cl. ..................................... 711/158; 710/309
(58) Field of Search ......................... 711/202, 157–158, 711/5, 209; 710/23, 119; 714/5–7; 365/228

(56) References Cited

U.S. PATENT DOCUMENTS

| | | | |
|---|---|---|---|
| 5,204,964 A | * 4/1993 | Bowden et al. | ............. 365/228 |
| 5,313,626 A | 5/1994 | Jones et al. | ..................... 714/5 |
| 5,331,646 A | 7/1994 | Krueger et al. | ................. 371/7 |
| 5,367,669 A | 11/1994 | Holland et al. | ............. 714/575 |
| 5,701,434 A | * 12/1997 | Nakagawa | ................. 711/157 |
| 6,098,132 A | 8/2000 | Olarig et al. | ................ 710/103 |
| 6,212,590 B1 | * 4/2001 | Melo et al. | .................. 710/119 |
| 6,223,301 B1 | * 4/2001 | Santeler et al. | ................ 714/6 |
| 6,301,299 B1 | * 10/2001 | Sita et al. | .............. 375/240.01 |
| 6,341,318 B1 | * 1/2002 | Dakhil | ........................ 710/23 |
| 6,427,196 B1 | * 7/2002 | Adiletta et al. | ............. 711/158 |
| 6,470,433 B1 | * 10/2002 | Prouty et al. | ............... 711/168 |
| 6,539,487 B1 | * 3/2003 | Fields et al. | ................ 713/340 |
| 6,564,304 B1 | * 5/2003 | Van Hook et al. | ......... 711/154 |
| 6,598,132 B2 | * 7/2003 | Tran et al. | .................. 711/154 |
| 6,625,685 B1 | * 9/2003 | Cho et al. | ...................... 711/5 |

* cited by examiner

Primary Examiner—Nasser Moazzami (57) ABSTRACT

A computer system includes a plurality of memory modules that contain semiconductor memory, such as DIMMs. The system includes a host/data controller that utilizes an XOR engine to store data and parity information in a striped fashion on the plurality of memory modules to create a redundant array of industry standard DIMMs (RAID). The host/data controller also interleaves data on a plurality of channels associated with each of the plurality of memory modules. To optimize memory bandwidth and reduce memory latency, various techniques are implemented in the present RAID system. Present techniques include providing dual memory arbiters, sorting read cycles by chip select or bank address, providing programmable upper and lower boundary registers to facilitate programmable memory mapping, and striping and interleaving memory data to provide a burst length of one.

19 Claims, 6 Drawing Sheets

MEMORY LATENCY AND BANDWIDTH OPTIMIZATIONS

BACKGROUND OF THE INVENTION

1. Field of the Invention

This invention relates generally to memory systems and, more particularly, to redundant memory systems with reduced memory latency and bandwidth optimization.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Computer usage has increased dramatically over the past few decades. In the past, computers were relatively few in number and primarily used as scientific tools. However, with the advent of standardized architectures and operating systems, computers have become virtually indispensable for a wide variety of uses from business applications to personal computing. Whether a computer system is a personal computer or a network of computers connected via a server interface, computers today rely on microprocessors, associated chip sets, and memory chips to perform most of their processing functions. Because these devices are integrated circuits formed on semiconducting substrates, the technological improvements of these devices have essentially kept pace with one another over the years. In contrast to the dramatic improvements of the processing portions of a computer system, the mass storage portion of a computer system has experienced only modest growth in speed and reliability. As a result, computer systems failed to capitalize fully on the increased speed of the improving processing systems due to the dramatically inferior capabilities of the mass data storage devices coupled to the systems.

While the speed of these mass storage devices, such as magnetic disk drives, has not improved much in recent years, the size of such disk drives has become smaller while maintaining the same or greater storage capacity. Furthermore, such disk drives have become less expensive. To capitalize on these benefits, it was recognized that a high capacity data storage system could be realized by organizing multiple small disk drives into an array of drives. However, it was further recognized that large numbers of smaller disk drives dramatically increased the chance of a disk drive failure which, in turn, increases the risk of data loss. Accordingly, this problem has been addressed by including redundancy in the disk drive arrays so that data lost on any failed disk drive can be reconstructed through the redundant information stored on the other disk drives. This technology has been commonly referred to as "redundant arrays of inexpensive disks" (RAID).

To date, at least five different levels of RAID have been introduced. The first RAID level utilized mirrored devices. In other words, data was written identically to at least two disks. Thus, if one disk failed, the data could be retrieved from one of the other disks. Of course, a level 1 RAID system requires the cost of an additional disk without increasing overall memory capacity in exchange for decreased likelihood of data loss. The second level of RAID introduced an error code correction (ECC) scheme where additional check disks were provided to detect single errors, identify the failed disk, and correct the disk with the error. The third level RAID system utilizes disk drives that can detect their own errors, thus eliminating the many check disks of level 2 RAID. The fourth level of RAID provides for independent read requests and write requests to each disk which allows parallel input-output operations. Finally, a level 5 RAID system provides memory striping where data and parity information are distributed in some form throughout the disk drives in the array.

The implementation of data redundancy, such as in the RAID schemes discussed above, creates fault tolerant computer systems where the system may still operate without data loss even if one drive fails. This is contrasted to a disk drive array in a non-fault tolerant system where the entire system is considered to have failed if any one of the drives fail. Of course, it should be appreciated that each RAID scheme necessarily trades some overall storage capacity and additional expense in favor of fault tolerant capability. Thus, RAID systems are primarily found in computers performing relatively critical functions where failures are not easily tolerated. Such functions may include, for example, a network server, a web server, a communication server, etc.

One of the primary advantages of a fault tolerant mass data storage system is that it permits the system to operate even in the presence of errors that would otherwise cause the system to malfunction. As discussed previously, this is particularly important in critical systems where downtime may cause relatively major economic repercussions. However, it should be understood that a RAID system merely permits the computer system to function even though one of the drives is malfunctioning. It does not necessarily permit the computer system to be repaired or upgraded without powering down the system. To address this problem, various schemes have been developed, some related to RAID and some not, which facilitate the removal and/or installation of computer components, such as a faulty disk drive, without powering down the computer system. Such schemes are typically referred to as "hot plug" schemes since the devices may be unplugged from and/or plugged into the system while it is "hot" or operating.

Although hot plug schemes have been developed for many computer components, including microprocessors, memory chips, and disk drives, most such schemes do not permit the removal and replacement of a faulty device without downgrading system performance to some extent. Furthermore, because memory chips have been traditionally more reliable than disk drives, error detection and correction schemes for memory chips have generally lagged behind the schemes used for disk drives.

However, certain factors may suggest that the reliability of semiconductor memory systems may also require improvement. For instance, in the near future, it is believed that it will be desirable for approximately 50% of business applications to run continuously 24 hours a day, 365 days a years. Furthermore, in 1998, it was reported that the average cost of a minute of downtime for a mission-critical application was $10,000.00. In addition to the increasing criticality of such computer systems and the high cost of downtime of such systems, the amount of semiconductor memory capacity of such systems has been increasing steadily and is expected to continue to increase. Although semiconductor memories are less likely to fail than disk drives, semiconductor memories also suffer from a variety of memory errors. Specifically, "soft" errors account for the vast majority of memory errors in a semiconductor memory. Such soft errors include cosmic rays and transient events, for instance, that tend to alter the data stored in the memory. Most soft errors are single bit errors that are correctable using standard ECC technology. However, some percentage of these errors are multi-bit errors that are uncorrectable by current ECC technology. Furthermore, the occurrence of soft errors increases linearly with memory capacity. Therefore, as memory capacities continue to increase, the number of soft errors will similarly increase, thus leading to an increased likelihood that the system will fail due to a soft error. Semiconductor memories may also suffer from "hard" errors. Such hard errors may be caused by over voltage conditions which destroy a portion of the memory structure, bad solder joints, malfunctioning sense amplifiers, etc. While semiconductor memories are typically subjected to rigorous performance and burn-in testing prior to shipment, a certain percentage of these memories will still malfunction after being integrated into a computer system. Again, as the number of memory chips and the memory capacities of computer systems increase, a likelihood of a semiconductor memory developing a hard error also increases.

System performance of a server depends strongly on the memory's bandwidth and latency. Traditionally, memory latency is quoted using two measures: access time and cycle time. Access time is the time between when a read is requested and when the desired data arrives. The cycle time is the minimum time between requests to memory. Accessing memory with the lowest latency and highest use of memory bandwidth is advantageous in today's computer systems. The longer it takes to access memory (access time) and complete a request (cycle time), the slower the performance of the computer system.

The present invention may be directed to one or more of the problems set forth above

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
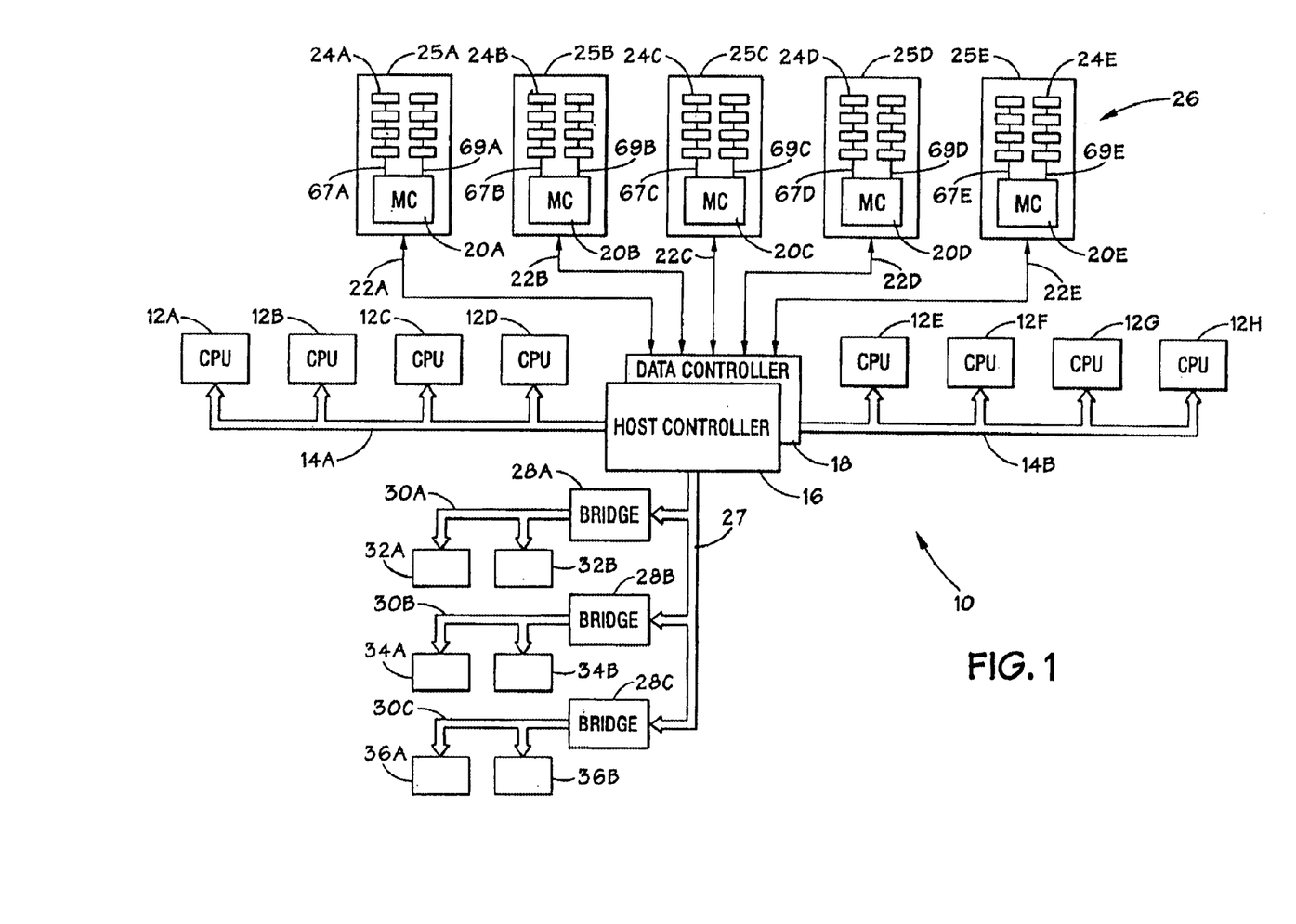
FIG. 1 is a block diagram illustrating an exemplary computer system in accordance with the present invention.

Turning now to the drawings and referring initially to FIG. 1, a block diagram of an exemplary computer system with multiple processor buses and an I/O bus, generally designated as reference numeral 10, is illustrated. The computer system 10 typically includes one or more processors or CPUs. In the exemplary embodiment, the system 10 utilizes eight CPUs 12A–12H. The system 10 utilizes a split-bus configuration in which the CPUs 12A–12D are coupled to a first bus 14A and the CPUs 12E–12H are coupled to a second bus 14B. It should be understood that the processors or CPUs 12A–12H may be of any suitable type, such as a microprocessor available from Intel, AMD, or Motorola, for example. Furthermore, any suitable bus configuration may be coupled to the CPUs 12A–12H, such as a single bus, a split-bus (as illustrated), or individual buses. By way of example, the exemplary system 10 may utilize Intel Pentium III processors and the buses 14A and 14B may operate at 100/133 MHz.

Each of the buses 14A and 14B is coupled to a chip set which includes a host controller 16 and a data controller 18. In this embodiment, the data controller 18 is effectively a data cross bar slave device controlled by the host controller 16. Therefore, these chips will be referred to together as the host/data controller 16, 18. The host/data controller 16, 18 is further coupled to one or more memory controllers. In this particular example, the host/data controller 16, 18 is coupled to five memory controllers 20A–20E via five individual memory bus segments 22A–22E, respectively. As will be appreciated from a study of the remainder of this disclosure, these individual memory bus segments 22A–22E (also referred to collectively as "MNET") facilitate the removal of individual memory modules. Each of the memory controllers 20A–20E is further coupled to a segment of main memory designated as 24A–24E, respectively. As discussed in detail below, each of the memory segments or modules 24A–24E is typically comprised of dual inline memory modules (DIMMs). Further, each memory module 24A–24E and respective memory controller 20A–20E may comprise a single memory cartridge 25A–25E which may be removable. In the present configuration, data may be stored in a "4+1" parity striping pattern wherein one of the memory cartridges 25A–25E is used to provide redundancy for the collective memory system 26, thereby providing hot plug capabilities for the memory cartridges 25A–25E.

As will be appreciated from the discussion herein, the number of memory segments 24 may vary depending upon the type of memory system desired. In general, redundant memory systems will utilize two or more memory segments 24. Although the five memory segments 24A–24E illustrated in the exemplary embodiment facilitates a "4+1" striping pattern of data and parity information as discussed in detail below, a memory system having two memory segments 24 may be used in which data is mirrored on each segment to provide redundancy. Similarly, a memory system having three or more memory segments may be used to provide various combinations of data and parity striping. Further, each memory segment 24A–24E may be divided into multiple channels, such as channels 67A–67E and 69A–69E. This division between channels allows the data to be "interleaved" between channels in a given memory segment 24A–24E. Interleaving and the advantages of such techniques are discussed in detail below.

The host/data controller 16, 18 is typically coupled to one or more bridges 28A–28C via a suitable bus 27. The opposite side of each bridge 28A–28C is coupled to a respective bus 30A–30C, and a plurality of peripheral devices 32A and B, 34A and B, and 36A and B may be coupled to the respective buses 30A, 30B, and 30C. The bridges 28A–28C may be any of a variety of suitable types, such as PCI, PCI-X, EISA, AGP, etc.

Each of the memory controllers 20A–20E and its associated main memory segment 24A–24E forms a portion of the main memory array 26. The five memory controllers 20A–20E operate in lock-step. In this example, the data is striped and each of the memory controllers 20A–20E handle a separate quad-word of each cacheline of data (assuming a 32 byte cacheline) that is being transferred to or from the host and data controllers 16 and 18. For example, the memory controller 20A handles the first quad-word of every data read and write transaction, the memory controller 20B handles the second quad-word, the memory controller 20C handles the third quad-word, and the memory controller 20D handles the fourth quad-word. Instead of receiving one of the four quad-words, the memory controller 20E handles data parity for the four quad-words handled by the memory controllers 20A–20D. Thus, as described below, the memory array 26 forms a "redundant array of industry standard DIMMs" (RAID) memory structure. By striping each cacheline of data to produce four quad-words and directing each quad-word to an independent memory controller 20A–20E, memory bandwidth is advantageously increased.

As will be explained in greater detail below, during a data read operation, the host/data controller 16, 18 receives four quad-words of data plus parity from the five memory controllers 20A–20E, validates data integrity of each quad-word and parity using ECC codes, and, if necessary, corrects bad data using an exclusive OR (XOR) engine before forwarding the data to its destination. During a data write operation, the host/data controller 16, 18 uses the XOR engine to calculate data parity and transfers the four quad-words of data and parity to the five respective memory controllers 20A–20E. In this embodiment, all data transfers between the host/data controller 16, 18 and the five memory controllers 20A–20E are an entire cacheline, and partial write requests are translated into read-modify-write operations.

Furthermore, as also described in greater detail below, the five MNET bus segments 22A–22E provide electrical isolation to each of the respective five memory controllers 20A–20E to facilitate hot-plug removal and/or replacement of each of the five memory segments 24A–24E. The RAID functionality described herein allows any one of the five memory segments 24A–24E to be removed while the system 10 continues to operate normally, albeit not in a redundant mode. Once the removed memory segment is reinstalled, the data is rebuilt from the other four memory segments, and the memory system resumes operation in its redundant, or fault-tolerant, mode.

The manner in which the memory array 26 operates in a redundant, i.e., RAID, mode has been described above. One benefit of such functionality is the ability to remove, replace, upgrade, or add DIMMs to a selected memory segment 24A–24E while the system 10 remains operational. Such capability may be referred to as "hot-plugging." As previously described, the memory segments 24A–24E may be configured as separate memory cartridges 25A–25E to facilitate hot-plugging operations. The memory controllers 20A–20E may be part of the cartridges or separate from them. The hot-plug events associated with the present system allow a user to remove a memory cartridge 25A–25E while the system remains operational.

It may be desirable to be able to replace individual memory modules (DIMMs) while the system is still operational. Such a "hot-replace" feature provides the ability in a fault-tolerant memory configuration to disable redundancy, replace a failed DIMM with an equivalent DIMM, and then re-establish redundancy without significantly impacting normal system operation and without requiring the system to be powered down. This is particularly advantageous in mission-critical systems which operate continually. If a fault is detected in a DIMM, the system is taken out of a redundant mode of operation, and the individual memory cartridge containing the faulty DIMM is powered-down. A user then replaces the faulty DIMM and inserts the memory cartridge back into the system. The memory cartridge is then powered-up. Once the memory cartridge is powered up, it is rebuilt and verified for functionality. If the memory cartridge has no faults, the system is returned to a redundant mode of operation.

Hot-add and hot-upgrade procedures may also be implemented using the techniques described above. A hot-add procedure is the ability to add one or more banks of DIMMs in empty DIMM sockets to a system that is currently operational to increase the memory capacity using the hot-plug procedures described above. A hot-upgrade procedure is the ability to replace an existing bank of DIMMs currently operational within the system with larger capacity DIMMs using the hot-plug procedures described above.

The memory array 26 normally operates in a pipelined mode in which multiple transactions may take place on the bus 22 at any given time. However, during an upgrade procedure, there may be differences between the new DIMMs and the existing DIMMs, such as timing and latency differences. Therefore, when the first DIMM is upgraded, the memory array 26 transitions from the pipelined mode into a non-pipelined mode in which only one transaction may take place on the bus at any given time. This transition essentially slows operation of the memory array 26 so that any timing differences between the DIMMs may be handled without creating data errors. Once all of the DIMMs have been replaced, rebuilt, and verified, the memory array 26 will transition back into the faster pipelined mode of operation. It should also be noted that the non-pipelined state may be entered to conserve power. In this context, the transition may take place upon user selection or based upon a signal from an appropriate system, such as a thermal indication from a power supply.

In this embodiment, each of the memory segments 24A–24E may include one to eight dual inline memory modules (DIMMs). Typically, such DIMMs are organized in an X4 or an X8 fashion. In other words, the memory chips on the DIMM are either 4 bits wide or 8 bits wide. To produce a 72 bit quad-word using an X4 memory organization, an exemplary DIMM may include nine 4 bit wide memory chips located on one side of the DIMM and nine 4 bit wide memory chips located on the opposite side of the DIMM. Conversely, to produce a 72 bit quad-word using an X8 memory organization, an exemplary DIMM may include nine 8 bit wide memory chips located on a single side of the DIMM. As discussed below, X8 memory organization may defeat the ECC capability to detect a failure in a single device. Therefore, an X4 memory organization may provide a slightly more reliable memory. The memory chips on each DIMM are typically selected from one or more DRAM technologies, such as synchronous DRAM, double data rate SDRAM, direct-RAM BUS, and synclink DRAM.

Figure 2:
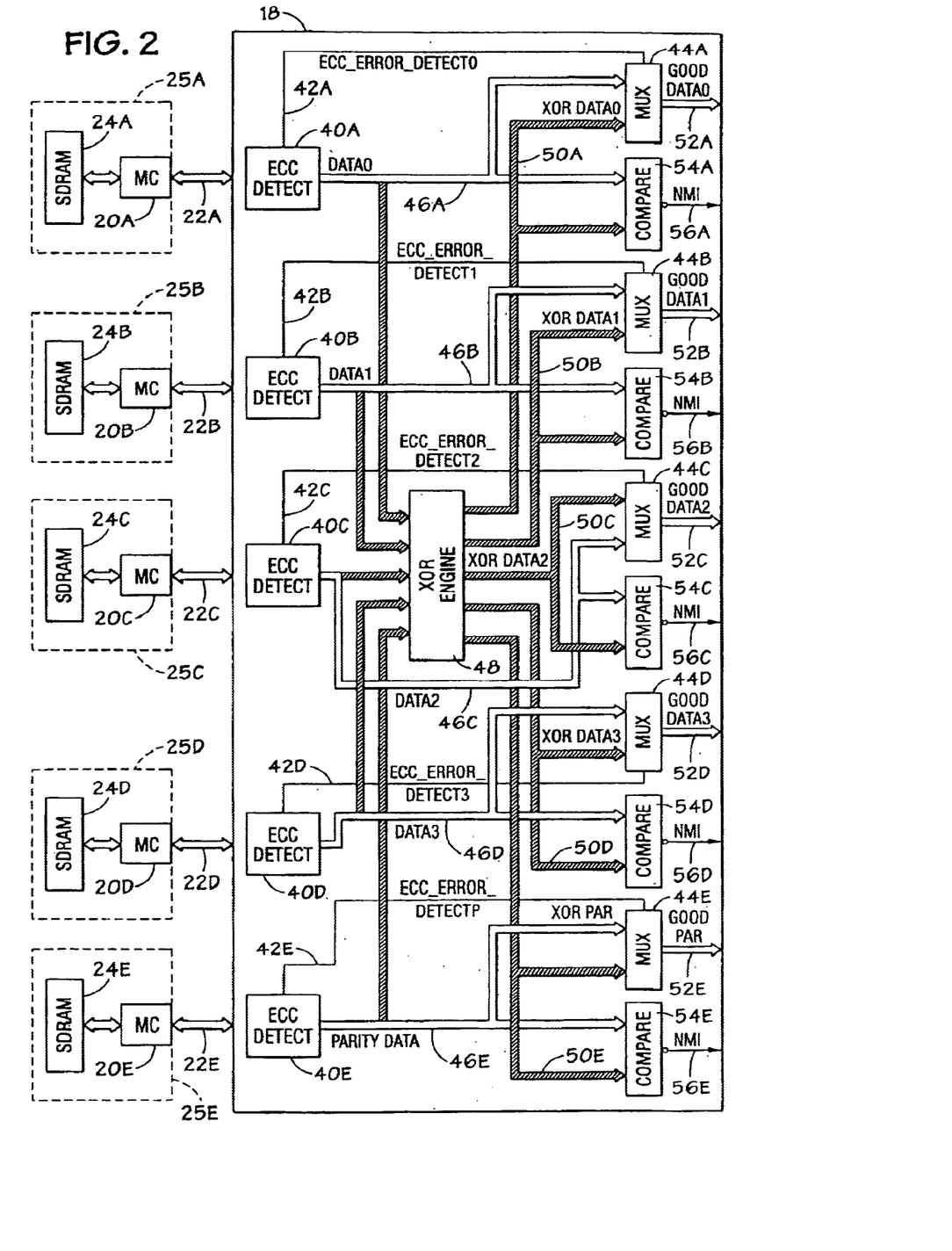
FIG. 2 is a block diagram generally illustrating one implementation of a RAID architecture in accordance with the present invention.

The manner in which the exemplary "4+1" RAID architecture functions will now be explained with reference to FIG. 2. During a memory read operation, a quad-word from each of the first four memory segments 24A–24D and parity from the one remaining memory segment 24E are transmitted to the respective memory controllers 20A–20E. Each memory controller 20A–20E includes error detection and correction algorithms. When operating in X4 memory mode, each of the memory controllers 20A–20E uses an ECC algorithm to detect single bit memory errors and a single bit error correction algorithm to correct any single bit errors detected by the ECC algorithm. When operating in X8 memory mode, each of the memory controllers 20A–20E uses an ECC algorithm to detect single bit errors, but such errors are not corrected by the memory controllers 20A–20E.

Indeed, it should be appreciated that parity information can detect a single bit error, but it cannot even detect, much less correct, double bit errors, multi-bit errors in a nibble or a byte, or any other type of error. Standard ECC algorithms, on the other hand, are more capable. ECC can detect and correct single bit errors, and can detect double bit errors and multi-bit errors in a nibble. ECC cannot detect multiple errors in both nibbles of a byte. However, as will be appreciated from the discussion herein, the RAID architecture can detect and correct single bit errors, double bit errors, multi-bit errors in a nibble, and multi-bit errors in a byte, as well as detect errors in other situations.

Once the memory controllers 20A–20E have processed the data as discussed above, the data is transferred via the respective memory buses 22A–22E to the host/data controller 16, 18. The host/data controller 16, 18 includes ECC modules 40A–40E to detect and correct single-bit errors and detect multi-bit errors in each of the four quad-words and the parity information delivered from the respective memory controllers 20A–20E. As with the ECC algorithm in the memory controllers 20A–20E, correctable single bit errors may be corrected by the ECC algorithm in the ECC modules 40A–40E. For uncorrectable single-bit errors and multi-bit errors, another data correction mechanism is advantageously provided.

The outputs 42A–42E of each of the ECC modules 40A–40E are coupled to a respective multiplexer 44A–44E. Based on the output 42A–42E of each of the ECC modules 40A–40E, each respective multiplexer 44A–44E selects between the original data delivered to the multiplexers 44A–44E on respective buses 46A–46E and the re-created data generated by the exclusive OR (XOR) engine 48 delivered to the multiplexers 44A–44E via the respective buses 50A–50E. Specifically, if one of the ECC modules 40A–40E detects a multi-bit error, the ECC module 40A–40E switches its respective multiplexer 44A–44E such that the bad data on the respective bus 46A–46E is replaced by the good re-created data available on the respective bus 50A–50E. Thus, when operating in X4 memory mode, the XOR engine 48 is used to correct multi-bit errors only, while when operating in X8 memory mode, the XOR engine 48 corrects both single bit errors and multi-bit errors.

A few aspects of this type of RAID functionality should be understood. First, when operating in X4 memory mode, each memory segment 24A–24E may exhibit a single bit error which may be corrected without even triggering the use of the re-created data generated by the XOR engine 48. However, only a single multi-bit error on one of the memory segments 24A–24E can be corrected per each memory transaction using the XOR engine 48. Conversely, when operating in X8 memory mode, the host/data controller 16, 18 can correct only one single bit error or multi-bit error in one of the memory segments 24A–24E. Thus, if more than one of the memory segments 24A–24E exhibits a single bit error or a multi-bit error in X8 memory mode, or if more than one of the memory segments 24A–24E exhibits a multi-bit error in X4 memory mode, the XOR engine 48 will be unable to create good data to be transmitted out of the host/data controller 16, 18 on the buses 52A–52E. In these circumstances, the comparator circuits 54A–54E, which receive the data on the respective bus errors 46A–46E and 50A–50E, deliver a non-maskable interrupt (NMI) on the respective lines 56A–56E. The NMI is typically delivered to the requesting device to indicate that a memory error has occurred and that the requested data cannot be delivered.

One advantage implemented by the system 10 is the technique of "pipelining" the data transferred across the memory bus 22. Pipelining refers to running multiple cycles at the same time. By striping each cacheline of data and implementing an independent memory controller 20A–20E to handle a single quad-word (i.e. a data segment having a burst length of one), access and cycle time are improved. Rather than having a single memory controller to provide memory access for an entire cacheline of data, multiple memory controllers 20A–20E may be used to simultaneously access different areas of the memory array 26.

Further, as previously described with reference to FIG. 1, the memory segments may be organized on a single channel or on 2N channels, where N is an integer. In this particular embodiment, each of the memory segments 24A–24E is divided into two channels—a first channel 67A–67E and a second channel 69A–69E, respectively. Since each memory segment 24A–24E in this embodiment is capable of containing up to eight DIMMs, each channel is adapted to access up to four of the eight DIMMs. Because this embodiment includes two channels, each of the memory controllers 20A–20E essentially comprise an ASIC which includes two independent memory controllers, as further described below with reference to FIG. 3.

Figure 3:
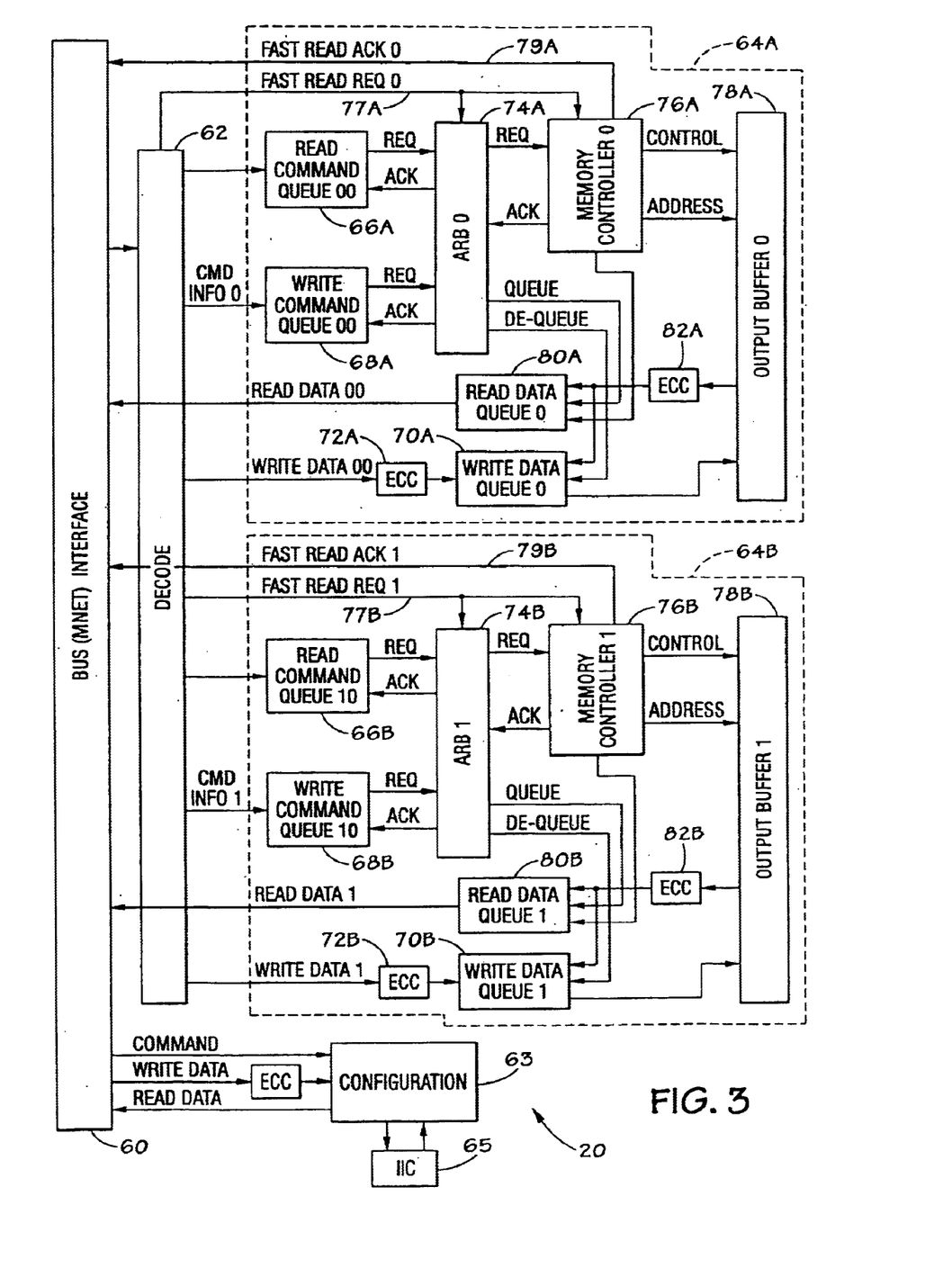
FIG. 3 is a block diagram illustrating an exemplary memory controller in accordance with the present invention.

A block diagram of an exemplary memory controller 20 is illustrated in FIG. 3. The memory controller 20 includes a bus interface 60 that is coupled to the respective memory bus segment 22A–22E to enable the memory controller 20 to pass data to and from the memory bus 22. In this example, the bus interface 60 communicates between the memory bus 22, which may operate at 400 MHz, for instance, and internal decode logic 62, which may operate at 100 or 133 MHz, for instance. One primary function of the bus interface 60 is to meet the protocol and timing requirements of the MNET or memory bus 22 for receiving write data and commands and for transmitting read data and status.

The decode logic 62 decodes the destination of read and write transactions according to the commands from the memory bus 22, as well as the internal set of configuration registers 63. In the case of memory transactions, the decode logic 62 generates the bank address, chip-select signals, and row and column addresses, as further described below. Commands, write data, and read data may be transferred between the decode logic 62 and the configuration registers 63 for a variety of reasons. For example, the configuration registers 63 may be used to store different CAS latencies, parameters that dictate memory controller operation, log information, ID information, and error capturing logic. The configuration registers 63 are coupled to an IIC bus 65 to permit communication with the DIMMs.

The decoded information from the decode logic 62 is then delivered to one of two identical memory controller circuits 64A and 64B, each of which controls a respective first channel 67 and a respective second channel 69. As discussed in greater detail with respect to FIG. 4, the memory controller circuit 64A generally handles the even cachelines for the first channel 67, while the memory controller circuit 64B generally handles the odd cachelines for the second channel 69. Read and write command information from the decode logic 62 is delivered, respectively, to the read command queues 66A and 66B and the write command queues 68A and 68B. Write data is delivered from the decode logic 62 to respective write data queues 70A and 70B. In this embodiment, each of the write data paths includes a respective ECC module 72A and 72B that is designed to detect and correct single bit errors in the write data before it reaches the respective write data queues 70A and 70B.

The read command and write command information from the queues 66A and 66B, 68A and 68B is delivered to a respective arbitration logic circuit 74A and 74B. The arbitration logic 74A and 74B controls transaction timing to the memory modules, and is typically employed to maximize bus bandwidth. The arbitration logic 74A and 74B delivers a request signal to a respective memory controller 76A and 76B which provides control and address information to a respective output buffer 78A and 78B. The arbitration logic 74A and 74B, in conjunction with the respective memory controller 76A and 76B also queues and/or dequeues write data stored in the write data queues 70A and 70B. It should also be noted that this embodiment includes fast read request lines 77A and 77B and fast read acknowledgement lines 79A and 79B. The fast read request lines 77A and 77B deliver a fast read request from the decode logic 62 to the respective memory controller 76A and 76B to request a read operation that bypasses the read command queue 66A and 66B—an operation that is permitted to reduce latency and improve timing during certain situations where the read command queue is empty. If the operation is permitted, an acknowledgement is transmitted from the respective memory controller 76A and 76B to the bus interface 60 on the fast read acknowledgement lines 79A and 79B. Alternatively, the fast read acknowledgment may be sent directly to the read command queues 66A and 66B.

During a read transaction, the data received from the DIMMs is transferred to a respective read data queue 80A and 80B. As with the write data, the read data may also be passed through a respective ECC circuit 82A and 82B to detect and optionally correct any single bit errors prior to the data reaching the respective read data queue 80A and 80B. The arbitration logic 74A and 74B, in conjunction with the memory controllers 76A and 76B, also controls the queuing and dequeuing of data in the read data queues 80A and 80B. Read data is delivered from the read data queues 80A and 80B to the bus interface 60 for transmission on the bus 22.

When a memory cycle is sent to a memory controller 20A–20E, the system address is mapped to a memory address. A memory address includes a chip select, bank address, row address, and column address. The chip select designates to which DIMM in a particular memory segment 24A–24E the cycle is targeted. The bank address selects to which bank within the DIMM the cycle is targeted. The row address selects a group of data words (called a "row") within a bank The column address selects the specific data word from the group of words of a given row address. The memory address is generally provided such that the least significant bits indicate the column address and the most significant bits indicate the chip select.

Sequential system accesses to consecutive cachelines (assuming a 32 byte cacheline) access addresses 0h, 20h, 40h, 60h. In traditional systems, these memory accesses are directed to chip select 0, bank 0, row 0, and col 0h, 4h, 8h, Ch. The length of each cacheline access is four data words. Since these accesses are to the same bank, traditional memory controllers typically open a bank and access each of the four columns used to store the 32-byte cacheline before closing the bank. Before accessing the same bank on the same DIMM, the open bank is closed by running a precharge. Disadvantageously, running multiple accesses to rows and columns in a single bank slows system performance because of the conflicts induced by repeated activity along the same buses and the continual targeting of the same DIMM.

The present system implements several techniques to increase the memory bandwidth and reduce memory latency. One technique involves "interleaving" the data so that each of the dual memory control circuits 64A and 64B (present in each memory controller 20A–20E) is only receiving every other request. Interleaving refers to assigning each request sequentially to alternating memory control circuits 64A and 64B to be processed on different channels 67A–67E and 69A–69E of the memory segments 24A–24E. As previously discussed, each memory control circuit 64A is associated with a respective channel 67A–67E, while each memory control circuit 64B is associated with a respective channel 69A–69E. In this context, interleaving refers to writing odd cachelines on the first channels 67A–67E and writing even cachelines on the second channels 69A–69E. As mentioned previously during the discussion of the exemplary memory controller illustrated in FIG. 3, the memory segments 24A–24E may be organized on a single channel or on 2N channels, where N is an integer, and in this particular embodiment, each of the memory segments 24A–24E is divided into two channels 67A–67E and 69A–69E. Since the channels 67A–67E and 69A–69E in this embodiment are capable of containing up to four DIMMs, a system may be constructed in which the memory devices in one channel 67 are not identical to the memory devices in the other channel 69 as will be further discussed with reference to FIG. 4. Although each memory segment 24A–24E will typically be identical to simplify timing and latency concerns, as well as to facilitate the striping of data across the multiple memory segments 24A–24E as described above, interleaving allows each channel to contain different amounts of memory. Further, this technique allows the implementation of both interleaved and non-interleaved memory portions.

Figure 4:
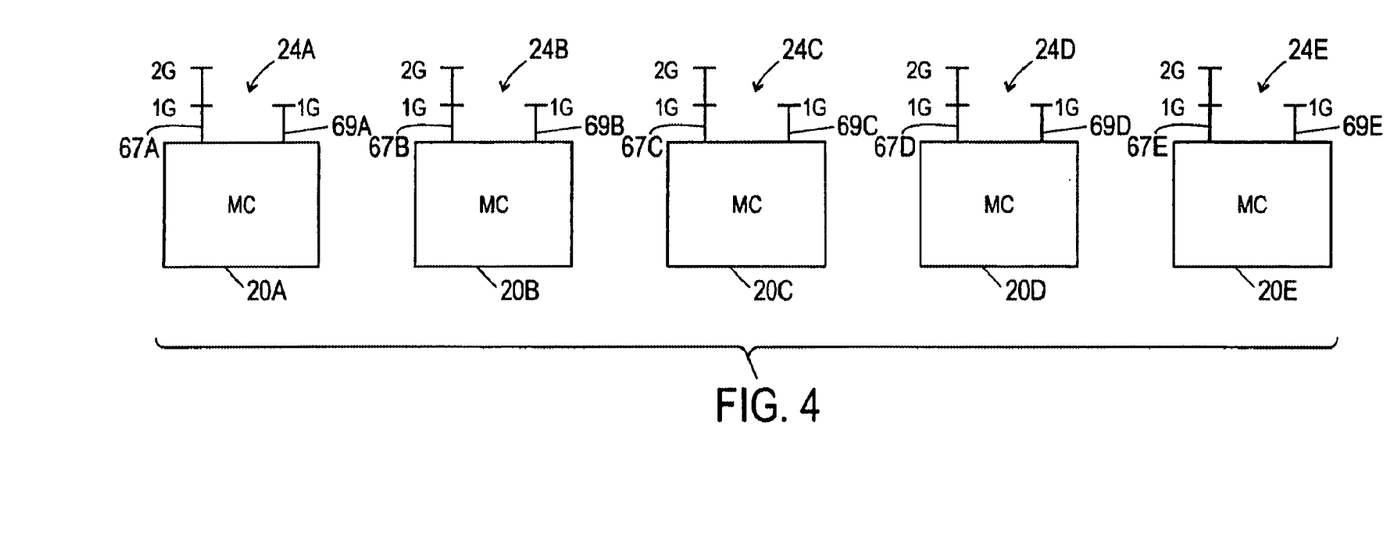
FIG. 4 illustrates a diagrammatic view of variously-sized channels of memory segments in accordance with the present invention.

By way of example, FIG. 4 illustrates the five memory segments 24A–24E in a configuration in which each of the first channels 67A–67E accesses a 1 GB DIMM and a 2 GB DIMM and each of the second channels 69A–69E accesses a 1 GB DIMM. Because the fifth memory segment 24E is used to store parity information in this running example, the available memory capacity for storing data resides on the first four memory segments 24A–24D and, thus, equals 16 GB. Of this 16 GB of memory, the addressable space available on both the first channels 67A–67D and the second channels 69A–69D equals 8 GB due to the presence of the 1 GB DIMMs on each of the channels 67A–67D and 69A–69D. Accordingly, the addressable space available past the space that is available on both channels equals 8 GB due to the presence of the 2 GB DIMMs on each of the first channels 67A–67D. Thus, the address space is mapped such that the space from 0 to 8 GB may be interleaved on both channels 67A–67D and 69A–69D, while the space from 8 GB to 16 GB will not be interleaved since it resides only on the first channels 67A–67D.

Given this exemplary construction, from 0 to 8 GB, odd cachelines are written on the first channels 67A–67D and even cachelines are written on the second channels

69A–69D. From 8 GB to 16 GB, all cachelines are written on the first channels 67A–67D. Thus, the memory array 26 in this example will contain an interleaved region from 0 to 8 GB and a non-interleaved region from 8 GB to 16 GB.

Of course, it should be understood that this discussion has focused on the address space defined by the first four memory segments 24A–24D. However, the discussion applies equally to the manner in which parity information is written to the fifth memory segment 24E. In other words, from 0 to 8 GB, odd cachelines of parity information are written on the first channel 67E and even cachelines of parity information are written on the second channel 69E, and from 8 GB to 16 GB, all cachelines of parity information are written on the first channel 67E.

It should be appreciated that additional channels would be interleaved in a similar fashion. In other words, if each memory segment 24A–24E included four channels instead of the two channels discussed by way of example above, memory devices present on each of the four channels would define an initial address space that would define an initial interleaved region. However, unlike the example discussed above, a secondary interleaved region may be defined by memory devices present on a selected two of the four channels.

In the present implementation, accesses to memory can be interleaved or non-interleaved, depending on the population of each memory segment 67A–67E and 69A–69E. In this implementation, the cacheline access is sent in parallel to the five memory modules 25A–25E, each containing two memory control circuits 64A and 64B. Using upper limit and lower limit configuration registers called "row boundary registers," the destination of the cycle can be determined. With the correct DIMMs, these registers can be programmed to allow interleaving between the two memory control circuits such that even cachelines go to a first memory control circuit 64A and odd cachelines go to a second memory control circuit 64B. To implement this feature, a lower boundary register in each memory controller 76A and 76B is programmed to the same value, and an upper boundary register associated with each of the memory controllers 76A and 76B is programmed to be incrementally larger than the size of the DIMM depending on the striping and interleaving configurations. It should be understood that each memory controller 76A and 76B has an upper and lower boundary register for each chip select on its respective bus. A single address bit, such as address bit 5, is used to select the odd and even cachelines. Performance is typically optimal when accesses are interleaved between the two memory control circuits 64A and 64B (each including a respective memory controller 76A and 76B), because each memory control circuit 64A and 64B is doing half the work. In addition, this technique creates gaps in the accesses at the memory controller level and allows the controller to perform other tasks, while preventing the system 10 from being adversely affected by the gap because the two controllers are working in parallel. The row boundary registers allow the user the flexibility to configure a system in the lower performing non-interleaved configuration. In this case, the boundary registers are programmed to unique values for each of the controllers 76A and 76B. This concept may be expanded to allow optimal flexibility and performance for a given configuration. Each controller 76A and 76B can be programmed to have an interleaved and a non-interleaved section, as previously discussed with reference to FIG. 4.

As previously discussed, performance can be gained by having consecutive cycles directed to different banks. The mapping of a system address to a memory address is traditionally set by the memory technology and hard-coded into the design. To allow added flexibility to the design, this mapping can be programmable. The programmability can be obtained by having a configuration register for each of the bank, row, and column bits that determines which system address bits are to be driven onto the given memory address line. Having this programmability allows design flexibility to support newer DIMMs as they become available. In addition, it allows low order system address bits to be mapped to the bank address bits. This will ensure that if a group of memory accesses are directed to sequential system address locations, the cycles can be pipelined on the bus. Exemplary mapping registers for implementing both interleaved and non-interleaved memory portions are illustrated in Appendices 1A and 1B. In one embodiment of the present techniques, a subset of the configuration registers may be programmable. In the system illustrated in Appendix 1B, for example, only bank address BA1, row addresses R0, R11 and R12, and column addresses C0, C9, C10, and C11 may be programmable.

A second technique for increasing memory bandwidth is to use either the chip select address or the bank address to perform yet another sorting of each request, thereby further diversifying the requests such that they are handled by different mechanisms. As with interleaving the addresses to ensure that consecutive requests are delivered alternately to separate channels, sorting by chip select or bank address and delivering the requests to alternating queues advantageously increases the memory bandwidth. To implement this technique, additional read and write queues 66C–66D and 68C–68D (not shown) are added to each dual memory control circuit 64A–64B. Rather than placing all read requests into one queue and all write requests into a second queue and issuing the commands in a first come, first served order, or simply alternating between two read and two write queues 66A–66B and 68A–68B as illustrated in FIG. 3, this implementation allows the read requests to be sorted by chip select or bank address. This sorting is known by the arbiter 74A–74B, and it can choose not to select cycles from the same queue in succession. Disadvantageously, if the arbiter 74A–74B were to select back-to-back cycles from the same queue, the cycle requests will go to the same chip select/bank address, and the second cycle will have to wait longer to run because it waits for completion of the first request (i.e., if the requests cannot be processed simultaneously).

In addition to each arbiter 74A and 74B taking advantage of the sorting of the incoming cycles by the techniques described above, each arbiter 74A and 74B is configured as a dual memory arbiter, thereby allowing the memory bus to be more highly pipelined. Traditional arbiters require one clock between back-to-back arbitrations for hand-shaking. The present arbitration scheme allows arbitration on successive clock cycles. The back end of each arbiter 74A and 74B is divided into a left and a right side to produce a dual memory arbiter that can alternate cycle requests on successive clock cycles.

Each arbiter 74A and 74B selects which cycle will run next by using a priority and round robin scheme. Each arbiter 74A and 74B arbitrates based on the requests that are asserted. To maximize pipelining on the memory bus, back-to-back arbitration should occur. To meet this requirement, each arbiter 74A and 74B is actually two arbiters that are mirrors of each other and which alternate arbitration of incoming cycles. This allows the next cycle to be selected and ready to run when the memory controller 20A–20E acknowledges the previous cycle.

Figure 5:
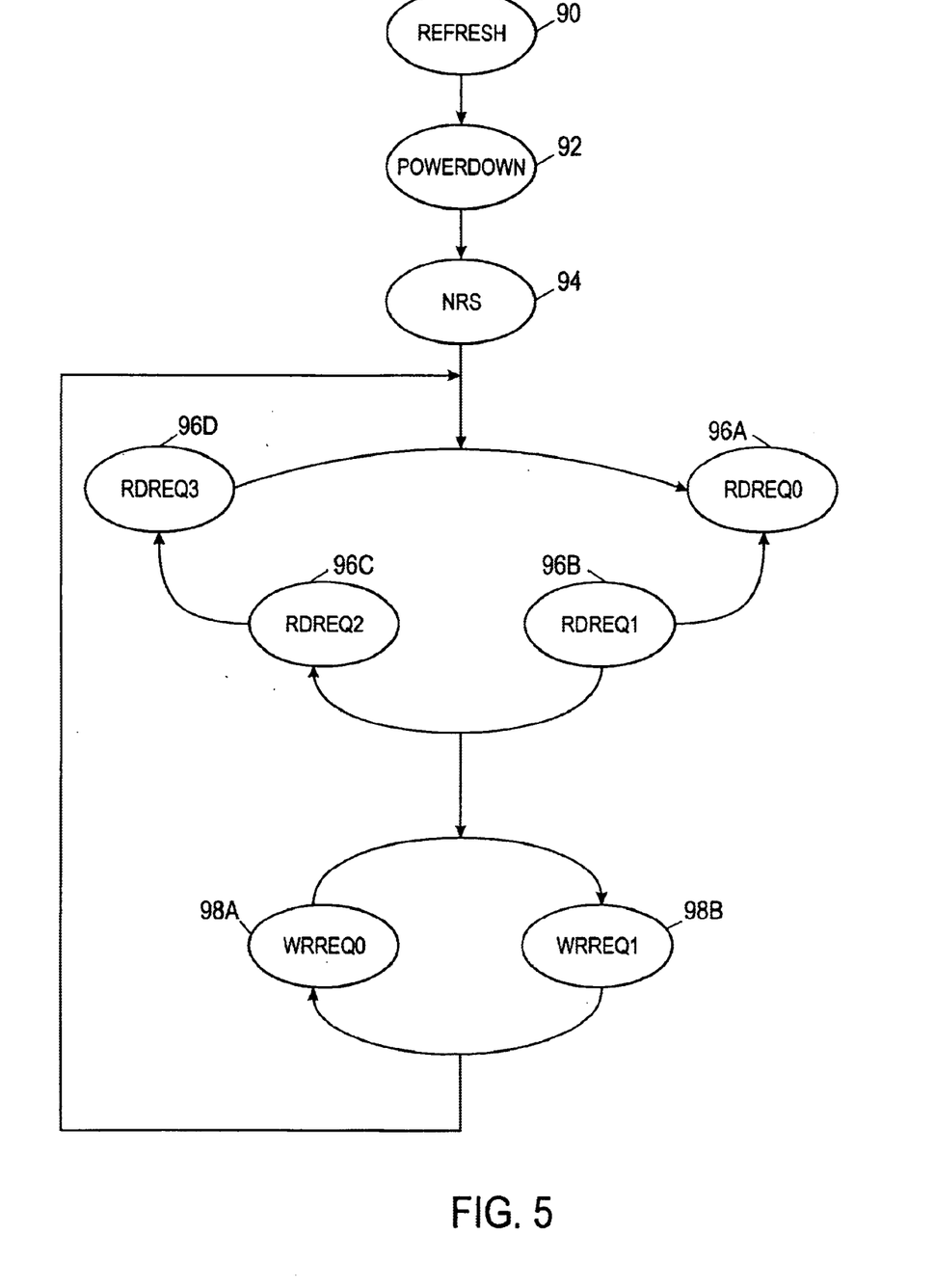
FIG. 5 illustrates a memory arbitration priority scheme in accordance with the present invention.

The general arbitration priority is illustrated in FIG. 5. Generally, requests are prioritized in the following order from highest to lowest: refreshes 90, powerdown 92, mode register set commands 94, read requests 96a–96d, and finally write requests 98a–98b. A refresh request 90 is initiated from refresh logic (not shown) in a memory controller 20A–20E. A refresh request 90 indicates that all memory devices on the corresponding memory cartridge 25A–25E require a refresh cycle. When the arbiter 74A–74B receives a refresh request 90, it will take priority over all other cycles.

The configuration register 63 can initiate a powerdown request 92 or mode register set command 94 when the corresponding bit in the configuration space is set by the host/data controller 16, 18. When a memory rebuild occurs during the power-up sequence, all memory bits are set to zero. When software detects that memory is cleared, it will configure the DIMM's by running the Mode Register Set (MRS) cycles 94. Because these special cycles occur very rarely, they do not actually feed into the arbiter, but will be treated as if they have higher priority than the read requests and write requests.

To keep read requests running in a pipelined fashion, the read queues have two unique qualities. First, the read requests, such as the read requests 96a–96d, are sorted into one of two queues depending on either chip selects or bank address. This sort will assist in alternating between each of the read queues 66A and 66B such that consecutive cycles are directed to different banks or different SDRAMs. Second, each read queue 66A and 66B has two requests so the arbiters 74A–74B can arbitrate all read requests before write requests. In the scheme illustrated in FIG. 5, the requests received from the first read queue 66A are RDREQ0 (96a) and RDREQ2 (96c), and the requests from the second read queue 66B are RDREQ1 (96b), and RDREQ3 (96d). The arbitration pattern between read requests is a round robin scheme, as illustrated in FIG. 5 and Table 1, below. The round robin arbitration scheme facilitates the alternating queue structure which helps maintain faster processing of the requests.

TABLE 1

Round Robin arbitration scheme for read requests

| RDREQ0 WINS | RDREQ1 WINS | RDREQ2 WINS | RDREQ3 WINS |
| --- | --- | --- | --- |
| RDREQ1 | RDREQ2 | RDREQ3 | RDREQ0 |
| RDREQ2 | RDREQ3 | RDREQ1 | RDREQ1 |
| RDREQ3 | RDREQ0 | RDREQ0 | RDREQ2 |

FIG. 5 also illustrates two write requests WRREQ0 (98a) and WRREQ1 (98b) that generally have a lower priority than the read requests 96a–96d. Read requests have higher priority than write requests and are executed before write requests unless 1) the read requesting and winning arbitration is to the same address as a write request or 2) the queue has reached a condition to force write requests (e.g., the write queue has reached a threshold value). Write requests will increase in priority if there is a read request in the read queue 66A or 66B with the same address as a write request in the write queue 68A or 68B, respectively. Content addressable memory (CAM) control logic (not shown) may reside in the host/data controller 16, 18 to compare the addresses in each of the read and write queues 66A–66B and 68A–68B. If a CAM operation results in a "camhit" (i.e. a request to the same address exists in each of the read and write queues 66A and 68A, for example), the write request is forced ahead of the read request to insure that the read request returns the most current data from the corresponding memory address. The other case that will increase the priority of write requests is if the write queue 68A–68B asserts the force write flag, indicating that the number of write requests in the write queue 68A–68B is above the programmable threshold. If the write queue 68A–68B is full and can no longer receive requests, system processing speed may be affected.

Figure 6:
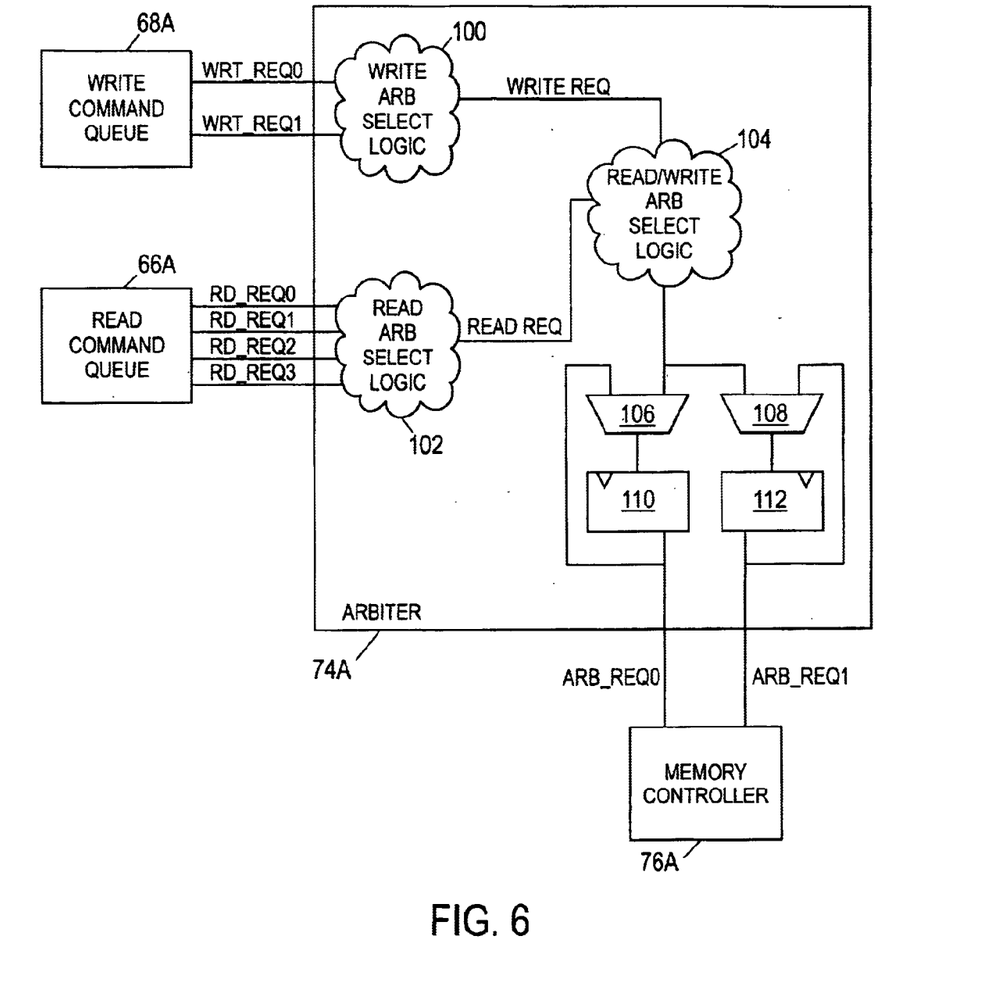
FIG. 6 is a block diagram illustrating an exemplary memory arbiter in accordance with the present invention.

FIG. 6 is a block diagram illustrating an exemplary arbiter 74A in accordance with the present embodiment and the priority scheme illustrated in FIG. 5. In the present example, the write command queue 68A has two entries WRREQ0 and WRREQ1. These requests are delivered from the write command queue 68A to write arbitration select logic 100 within the arbiter 74A. The arbitration logic may be a multiplexor, for example, which prioritizes the write requests WRREQ0 and WRREQ1 on a first-in, first-out basis. In this case, if WRREQ0 is received first, it would win the arbitration and would be the first write request delivered out of the write arbitration select logic 100. Similarly, the arbiter 74A includes read arbitration logic 102 to sort the read requests received from the read command queue 66A. Here, the read arbitration select logic 102 may be a multiplexor which prioritizes the read requests RDREQ0, RDREQ1, RDREQ2, and REDREQ3 on a first-in, first-out basis. In this case, if RDREQ0 is received first, it would win the arbitration and would be the first read request delivered out of the read arbitration select logic 102. It should be noted that while the write and read arbitration select logic 100 and 102 are discussed as mechanisms which arbitrate among respective requests on a first-in, first-out basis, it is also possible that certain of the respective requests may be delivered with a priority bit such that initiation of the priority bit insures that the request will be prioritized ahead of all other requests whose priority bit is not initiated.

Once the write arbitration select logic 100 and the read arbitration select logic 102 arbitrate among their respective requests to provide an ordered output wherein the respective read and write requests are prioritized at the output of the write and read arbitration select logic 100 and 102, the requests are delivered to the read/write arbitration select logic 104. The read/write arbitration select logic 104 arbitrates between the read and write requests, as discussed with reference to FIG. 5. Read requests will generally be prioritized ahead of write requests, except in the case of a camhit or a full write queue, as previously discussed.

Each read and write request is prioritized through the read/write arbitration select logic 104 and delivered to logic which is provided to facilitate the dual arbitration scheme to allow the processing of back-to-back requests on successive clock cycles. The output of the read/write arbitration select logic 104 is delivered to two multiplexors 106 and 108. The present configuration results in requests being delivered alternately to each of the two multiplexors 106 and 108. The output of each multiplexor 106 and 108 is coupled to a storage device, such as a latch 110 and 112, to store a respective request temporarily before it is sent to the memory controller 76A. As can be appreciated, each latch 110 and 112 uses a first clock cycle to latch a request in and a second clock cycle to latch the request out. By providing the dual multiplexor-latch configuration at the output of the read/write arbitration select logic 104, requests can be delivered to the memory controller 76A on back-to-back clock cycles. As the first latch 110 is receiving a request on a first clock cycle, the second latch 112 is delivering a request to the memory controller 76A. On the next clock cycle, the request in the first latch 110 can be sent to the memory controller 76A while the second latch 112 is loaded with a new request.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

APPENDIX 1A

NON-STRIPED

| | 64 mB | 2 bank | 64 mB | 4 bank | 128 Mb | 4 bank | | 256 Mb | 4 bank | | 512 Mb | 4 bank | |
|---|---|---|---|---|---|---|---|---|---|---|---|---|---|
| | ×4 | ×8 | ×4 | ×8 | ×4 | ×8 | ×16 | ×4 | ×8 | ×16 | ×4 | ×8 | ×16 |
| BA0 | A7 | A7 | A7 | A7 | A7 | A7 | A7 | A7 | A7 | A7 | A7 | A7 | A7 |
| BA1 | | | A8 | A8 | A8 | A8 | A8 | A8 | A8 | A8 | A8 | A8 | A8 |
| R0 | A6 | A6 | A6 | A6 | A6 | A6 | A6 | A6 | A6 | A6 | A6 | A6 | A6 |
| R1 | A9 | A9 | A9 | A9 | A9 | A9 | A9 | A9 | A9 | A9 | A9 | A9 | A9 |
| R2 | A10 | A10 | A10 | A10 | A10 | A10 | A10 | A10 | A10 | A10 | A10 | A10 | A10 |
| R3 | A11 | A11 | A11 | A11 | A11 | A11 | A11 | A11 | A11 | A11 | A11 | A11 | A11 |
| R4 | A12 | A12 | A12 | A12 | A12 | A12 | A12 | A12 | A12 | A12 | A12 | A12 | A12 |
| R5 | A13 | A13 | A13 | A13 | A13 | A13 | A13 | A13 | A13 | A13 | A13 | A13 | A13 |
| R6 | A14 | A14 | A14 | A14 | A14 | A14 | A14 | A14 | A14 | A14 | A14 | A14 | A14 |
| R7 | A15 | A15 | A15 | A15 | A15 | A15 | A15 | A15 | A15 | A15 | A15 | A15 | A15 |
| R8 | A16 | A16 | A16 | A16 | A16 | A16 | A16 | A16 | A16 | A16 | A16 | A16 | A16 |
| R9 | A17 | A17 | A17 | A17 | A17 | A17 | A17 | A17 | A17 | A17 | A17 | A17 | A17 |
| R10 | A18 | A18 | A18 | A18 | A18 | A18 | A18 | A18 | A18 | A18 | A18 | A18 | A18 |
| R11 | A19 | A19 | A19 | A19 | A19 | A19 | A19 | A19 | A19 | A19 | A19 | A19 | A19 |
| R12 | A8 | A8 | | | | | | A30 | A29 | A28 | A31 | A30 | A29 |
| C0 | A5 | A5 | A5 | A5 | A5 | A5 | A5 | A5 | A5 | A5 | A5 | A5 | A5 |
| C1 | A20 | A20 | A20 | A20 | A20 | A20 | A20 | A20 | A20 | A20 | A20 | A20 | A20 |
| C2 | A21 | A21 | A21 | A21 | A21 | A21 | A21 | A21 | A21 | A21 | A21 | A21 | A21 |
| C3 | A22 | A22 | A22 | A22 | A22 | A22 | A22 | A22 | A22 | A22 | A22 | A22 | A22 |
| C4 | A23 | A23 | A23 | A23 | A23 | A23 | A23 | A23 | A23 | A23 | A23 | A23 | A23 |
| C5 | A24 | A24 | A24 | A24 | A24 | A24 | A24 | A24 | A24 | A24 | A24 | A24 | A24 |
| C6 | A25 | A25 | A25 | A25 | A25 | A25 | A25 | A25 | A25 | A25 | A25 | A25 | A25 |
| C7 | A26 | A26 | A26 | A26 | A26 | A26 | A26 | A26 | A26 | A26 | A26 | A26 | A26 |
| C8 | A27 | A27 | A27 | A27 | A27 | A27 | A27 | A27 | A27 | A27 | A27 | A27 | A27 |
| C9 | A28 | | A28 | | A28 | A28 | | A28 | A28 | | A28 | A28 | A28 |
| C11 | | | | | A29 | | | A29 | | | A29 | A29 | |
| C12 | | | | | | | | | | | A30 | | |

APPENDIX 1B

STRIPED

| | 64 mB | 2 bank | 64 mB | 4 bank | 128 Mb | 4 bank | | 256 Mb | 4 bank | | 512 Mb | 4 bank | |
|---|---|---|---|---|---|---|---|---|---|---|---|---|---|
| | ×4 | ×8 | ×4 | ×8 | ×4 | ×8 | ×16 | ×4 | ×8 | ×16 | ×4 | ×8 | ×16 |
| BA0 | A7 | A7 | A7 | A7 | A7 | A7 | A7 | A7 | A7 | A7 | A7 | A7 | A7 |
| BA1 | | | A8 | A8 | A8 | A8 | A8 | A8 | A8 | A8 | A8 | A8 | A8 |
| R0 | A29 | A28 | A29 | A28 | A30 | A29 | A28 | A31 | A30 | A29 | A32 | A31 | A30 |
| R1 | A9 | A9 | A9 | A9 | A9 | A9 | A9 | A9 | A9 | A9 | A9 | A9 | A9 |
| R2 | A10 | A10 | A10 | A10 | A10 | A10 | A10 | A10 | A10 | A10 | A10 | A10 | A10 |
| R3 | A11 | A11 | A11 | A11 | A11 | A11 | A11 | A11 | A11 | A11 | A11 | A11 | A11 |
| R4 | A12 | A12 | A12 | A12 | A12 | A12 | A12 | A12 | A12 | A12 | A12 | A12 | A12 |
| R5 | A13 | A13 | A13 | A13 | A13 | A13 | A13 | A13 | A13 | A13 | A13 | A13 | A13 |
| R6 | A14 | A14 | A14 | A14 | A14 | A14 | A14 | A14 | A14 | A14 | A14 | A14 | A14 |
| R7 | A15 | A15 | A15 | A15 | A15 | A15 | A15 | A15 | A15 | A15 | A15 | A15 | A15 |
| R8 | A16 | A16 | A16 | A16 | A16 | A16 | A16 | A16 | A16 | A16 | A16 | A16 | A16 |
| R9 | A17 | A17 | A17 | A17 | A17 | A17 | A17 | A17 | A17 | A17 | A17 | A17 | A17 |
| R10 | A18 | A18 | A18 | A18 | A18 | A18 | A18 | A18 | A18 | A18 | A18 | A18 | A18 |
| R11 | A19 | A19 | A19 | A19 | A19 | A19 | A19 | A19 | A19 | A19 | A19 | A19 | A19 |
| R12 | A8 | A8 | | | | | | A30 | A29 | A28 | A31 | A30 | A29 |
| C0 | A5 | A5 | A5 | A5 | A5 | A5 | A5 | A5 | A5 | A5 | A5 | A5 | A5 |
| C1 | A20 | A20 | A20 | A20 | A20 | A20 | A20 | A20 | A20 | A20 | A20 | A20 | A20 |
| C2 | A21 | A21 | A21 | A21 | A21 | A21 | A21 | A21 | A21 | A21 | A21 | A21 | A21 |
| C3 | A22 | A22 | A22 | A22 | A22 | A22 | A22 | A22 | A22 | A22 | A22 | A22 | A22 |
| C4 | A23 | A23 | A23 | A23 | A23 | A23 | A23 | A23 | A23 | A23 | A23 | A23 | A23 |
| C5 | A24 | A24 | A24 | A24 | A24 | A24 | A24 | A24 | A24 | A24 | A24 | A24 | A24 |
| C6 | A25 | A25 | A25 | A25 | A25 | A25 | A25 | A25 | A25 | A25 | A25 | A25 | A25 |
| C7 | A26 | A26 | A26 | A26 | A26 | A26 | A26 | A26 | A26 | A26 | A26 | A26 | A26 |
| C8 | A27 | A27 | A27 | A27 | A27 | A27 | A27 | A27 | A27 | A27 | A27 | A27 | A27 |

APPENDIX 1B-continued

| | | | | | STRIPED | | | | | | | |
|---|---|---|---|---|---|---|---|---|---|---|---|---|
| | 64 mB | 2 bank | 64 mB | 4 bank | 128 Mb | | 4 bank | 256 Mb | | 4 bank | 512 Mb | | 4 bank |
| | ×4 | ×8 | ×4 | ×8 | ×4 | ×8 | ×16 | ×4 | ×8 | ×16 | ×4 | ×8 | ×16 |
| C9 | A28 | | A28 | | A28 | A28 | | A28 | A28 | | A28 | A28 | A28 |
| C11 | | | | | A29 | | | A29 | | | A29 | A29 | |
| C12 | | | | | | | | | | | A30 | | |

What is claimed is:

1. A method of processing a read request comprising the acts of:
  transmitting a first read request from a requesting device, the first read request comprising a first system address;
  receiving the first read request at a memory controller;
  mapping the first system address into a first memory address, the first memory address comprising a first chip select, a first bank address, a first row address and a first column address; and
  sorting the first read request by one of the first chip select and the first bank address such that the first read request is injected into a selected one of a first read queue and a second read queue based on the sorting by the one of the first ship select and the first bank address.

2. The method of processing a read request, as set forth in claim 1, comprising the acts of:
  receiving a second read request at the memory controller, the second read request having a second system address and being received immediately subsequent to the first read request;
  mapping the second system address into a second memory address, the second memory address comprising a second chip select, a second bank address, a second row address and a second column address; and
  sorting the second read request by one of the corresponding second chip select and second bank address such that the second read request is injected into a second read queue if the one of the first chip select and first bank address corresponding to the first read request is different as the one of the second chip select and second bank address corresponding to the second read request and wherein the second read queue is different from the first read queue.

3. The method of processing a read request, as set forth in claim 2, comprising the act of alternately selecting read requests from the first read queue and the second read queue such that back-to-back requests are alternately processed between the first read queue and the second read queue.

4. The method of processing a read request, as set forth in claim 3, wherein the act of alternately selecting read requests is performed by an arbiter.

5. The method of processing a read request, as set forth in claim 2, comprising the act of selecting read requests to be processed such that back-to-back requests are not processed to the same chip select.

6. The method of processing a read request, as set forth in claim 2, comprising the act of selecting read requests to be processed such that back-to-back requests are not processed to the same bank address.

7. The method of processing a read request, as set forth in claim 2, wherein the second chip select corresponding to the second read request identifies a corresponding dual inline memory module (DIMM) to which the second read request is directed.

8. The method of processing a read request, as set forth in claim 2, wherein the second bank address corresponding to the second read request identifies a corresponding bank in a corresponding dual inline memory module (DIMM) to which the second read request is directed.

9. The method of processing a read request, as set forth in claim 1, wherein the first chip select corresponding to the first read request identifies a corresponding dual inline memory module (DIMM) to which the first read request is directed.

10. The method of processing a read request, as set forth in claim 1, wherein the first bank address corresponding to the first read request identifies a corresponding bank in a corresponding dual inline memory module (DIMM) to which the first read request is directed.

11. A method of processing read requests in a redundant memory system comprising the acts of:
  (a) receiving a plurality of read requests at a memory controller, each read request having a corresponding chip select and bank address;
  (b) inserting the plurality of read requests into one or more queues; and
  (c) prioritizing the processing of the plurality of read requests such that back-to-back read requests are not directed to the same one of a corresponding chip select and a bank address.

12. The method of processing read requests in a redundant memory system, as set forth in claim 11, wherein act (b) comprises the act of inserting the plurality of read requests into one of a first queue and a second queue.

13. The method of processing read requests in a redundant memory system, as set forth in claim 12, wherein act (c) comprises the act of alternately selecting read requests from the first queue and the second queue such that back-to-back requests are alternately processed between the first queue and the second queue.

14. The method of processing read requests in a redundant memory system, as set forth in claim 13, wherein the act of alternately selecting read requests is performed by an arbiter.

15. The method of processing read requests in a redundant memory system, as set forth in claim 11, wherein the chip select identifies a corresponding dual inline memory module (DIMM) to which a corresponding one of the plurality of read requests is directed.

16. The method of processing read requests in a redundant memory system, as set forth in claim 11, wherein the bank address identifies a corresponding bank in a corresponding dual inline memory module (DIMM) to which a corresponding one of the plurality of read requests is directed.

17. A memory cartridge comprising:

a plurality of memory devices;

a memory controller operably coupled to the plurality of memory devices and configured to receive a plurality of read requests from a requesting device, each of the plurality of read requests comprising a chip select and a bank address, wherein the memory controller is further configured to sort the plurality of read requests by one of the corresponding chip select and bank address;

a first and second read queues each operably coupled to the memory controller and each configured to store the read requests sorted by the memory controller; and an arbiter operably coupled to each of the first and second read queues and configured to select read requests stored in the queues such that consecutive read requests do not have the same one of the chip select and the bank address.

18. The memory cartridge, as set forth in claim 17, wherein the plurality of memory devices comprises a plurality of synchronous dynamic random access memory (SDRAM) devices.

19. The memory cartridge, as set forth in claim 17, wherein the arbiter is configured to select consecutive read requests alternately between the first and second read queues.

* * * * *